US008572288B2

(12) United States Patent
Jha et al.

(10) Patent No.: US 8,572,288 B2
(45) Date of Patent: Oct. 29, 2013

(54) SINGLE LOGICAL NETWORK INTERFACE FOR ADVANCED LOAD BALANCING AND FAIL-OVER FUNCTIONALITY

(75) Inventors: Ashutosh K. Jha, Sunnyvale, CA (US); Ayaz Abdulla, Sunnyvale, CA (US); Hemamalini Manickavasagam, San Jose, CA (US); Anand Rajagopalan, Saratoga, CA (US); Paul J. Sidenblad, Cupertino, CA (US)

(73) Assignee: Nvidia Corporation, Santa Clara, CA (US)

(*) Notice: Subject to any disclaimer, the term of this patent is extended or adjusted under 35 U.S.C. 154(b) by 1677 days.

(21) Appl. No.: 11/303,779

(22) Filed: Dec. 15, 2005

(65) Prior Publication Data

US 2007/0168563 A1 Jul. 19, 2007

(51) Int. Cl.
*G06F 15/16* (2006.01)

(52) U.S. Cl.
USPC .......................................................... 709/250

(58) Field of Classification Search
USPC .......................................................... 709/250
See application file for complete search history.

(56) References Cited

U.S. PATENT DOCUMENTS

| | | | |
|---|---|---|---|
| 6,105,151 A | 8/2000 | Mahalingam et al. | |
| 6,229,538 B1 | 5/2001 | McIntyre et al. | |
| 6,253,334 B1 | 6/2001 | Amdahl et al. | |
| 6,308,282 B1 | 10/2001 | Huang et al. | |
| 6,512,774 B1 | 1/2003 | Vepa et al. | |
| 6,560,630 B1 | 5/2003 | Vepa et al. | |
| 6,567,377 B1 | 5/2003 | Vepa et al. | |
| 6,590,861 B1 | 7/2003 | Vepa et al. | |
| 6,683,882 B1 | 1/2004 | Maufer et al. | |
| 6,687,758 B2 | 2/2004 | Craft et al. | |
| 6,938,092 B2 | 8/2005 | Burns | |
| 6,941,377 B1* | 9/2005 | Diamant et al. | 709/230 |
| 7,082,530 B1* | 7/2006 | Diamant | 713/153 |
| 2003/0046472 A1* | 3/2003 | Morrow | 710/305 |
| 2004/0008705 A1* | 1/2004 | Lindsay | 370/401 |
| 2004/0015966 A1 | 1/2004 | MacChiano et al. | |
| 2005/0138620 A1* | 6/2005 | Lewites | 718/1 |
| 2006/0010238 A1 | 1/2006 | Craft et al. | |
| 2006/0010253 A1* | 1/2006 | Aiken et al. | 709/250 |

(Continued)

FOREIGN PATENT DOCUMENTS

| | | |
|---|---|---|
| JP | 2000-244527 | 9/2000 |
| JP | 2005-085284 | 3/2005 |

OTHER PUBLICATIONS

Intel—Installing and Configuring Intel Advanced Network Services (ANS) on the Linux 2.2.x and 2.4.x Kernels (Intel 32/64-bit architectures), http://web.archive.org/web/20041205091315/http://www.intel.com/support/network/adapter/1000/linux/ans.htm, retrieved on Mar. 25, 2009, from archive date Dec. 5, 2004.*
Office Action. U.S. Appl. No. 11/303,281. Dated Mar. 9, 2009.
Bhutani, et al. Using NIC Teaming to Achieve High Availability on Linux Platforms, Power Solutions, 4 pages, Feb. 2003.
Intel, Intel Advanced Network Services Software, White Paper. 8 pages, 2004.

(Continued)

*Primary Examiner* — Kevin Mai
(74) *Attorney, Agent, or Firm* — Patterson & Sheridan, L.L.P.

(57) ABSTRACT

The invention sets forth an approach for aggregating a plurality of NICs in a computing device into a single logical NIC as seen by that computing device's operating system. The combination of the single logical NIC and a network resource manager provides a reliable and persistent interface to the operating system and to the network hardware, thereby improving the reliability and ease-of-configuration of the computing device. The invention also may improve communications security by supporting the 802.1X and the 802.1Q networking standards.

16 Claims, 3 Drawing Sheets

(56) References Cited

U.S. PATENT DOCUMENTS

| | | | |
|---|---|---|---|
| 2006/0248191 A1* | 11/2006 | Hudson et al. | 709/226 |
| 2007/0025252 A1* | 2/2007 | McGee et al. | 370/235 |
| 2007/0025253 A1* | 2/2007 | Enstone et al. | 370/235 |
| 2007/0110244 A1* | 5/2007 | Sood et al. | 380/270 |
| 2007/0168563 A1 | 7/2007 | Jha et al. | |

OTHER PUBLICATIONS

English Translation of JP 2000-244527.

English Translation of JP 2005-085284.

Summary of Notice of Final Rejection for JP Pat. App. No. 2006-338932, dated Sep. 11, 2009.

* cited by examiner

SINGLE LOGICAL NETWORK INTERFACE FOR ADVANCED LOAD BALANCING AND FAIL-OVER FUNCTIONALITY

BACKGROUND OF THE INVENTION

1. Field of the Invention

Embodiments of the present invention relate generally to the field of computer networking and more specifically to a single logical network interface with advanced load balancing and fail-over functionality.

2. Description of the Related Art

A network computing device oftentimes has two or more network interface cards to increase the computing device's communication bandwidth beyond what a single NIC is able to provide. Such a plurality of NICs is commonly referred to as a "team" of NICs. Typically, the team shares a common Internet Protocol (IP) address while maintaining unique Media Access Control (MAC) addresses for each NIC within the team. One aspect of using this team configuration is that network traffic between the computing device and other computing devices in the network may be distributed among the NICs in the team such that the overall throughput of the team may be maximized. This type of operation is referred to as "load balancing." Another aspect of using a team configuration is that network traffic may be migrated from a nonfunctional or unreliable NIC within the team to a functional or more reliable NIC within the team. This type of operation is referred to as "fail-over." The combination of load balancing and fail-over in a single implementation is typically referred to as "LBFO."

For an LBFO implementation to set up and migrate network connections between NICs to optimize the computing device's network communications throughput and reliability, the LBFO implementation may monitor operational parameters at the NIC level, such as the error rate on each NIC and the amount of data exchanged through each network connection. Typical LBFO implementations locate their LBFO software in the operating system and request the NIC-level operational parameters from the NIC hardware through one or more device drivers. The resulting architectures are inherently inefficient because they place the LBFO decision making and management functionalities several software levels away from where the operational parameters are monitored, requiring a substantial amount of ongoing communication between software levels. Further, to decrease the communication required between software levels and/or because the LBFO implementations in operating systems are not fully optimized for LBFO, the LBFO decision making elements in prior art LBFO implementations may not utilize all operational parameters available at the NIC level. Thus, LBFO implementations residing in operating systems may be lower performing due to excessive software communications between software levels and LBFO decision making based on limited NIC-level operational information.

In addition, for an LBFO implementation to be reliable and to maintain high performance, its configuration should not be subject to change by either the operating system or some third party, such as a user or an application program. Typical LBFO implementations expose each NIC in the team to the operating system, giving the operating system a substantial degree of control over the NICs, including the ability to reconfigure any of the NICs. In such implementations, the operating system may be able to change the IP address associated with the team of NICs or change the security settings or communications parameters for a particular NIC. Further, to the extent the NICs are also exposed to third parties as a result of their exposure to the operating system, a third party may be able to similarly reconfigure the NICs. For example, a user may be able to mistakenly disable or reconfigure a reliable NIC or mistakenly enable an unreliable NIC. As a general matter, a team of NICs is configured to optimize a particular LBFO architecture. Unilaterally reconfiguring a NIC once that NIC has been configured for a team may very well undermine that optimization, thereby lowering the performance and/or reliability of the computing device's network communications.

Further, for a LBFO implementation to be most useful in modern networks, the implementation should account for additional security features that may be in use in the network. One such security feature is the Institute of Electrical and Electronics Engineers (IEEE) security credentials protocol (hereafter referred to as "802.1X"), which improves network security by requiring a NIC to request authentication from a security credential server before the NIC may communicate with a switch. Another security feature is the IEEE "Virtual LAN" protocol (hereafter referred to as "802.1Q"), which may also improve network security by allowing a network administrator to configure a range of IP addresses as a virtual LAN (VLAN) and selectively assign machines to the VLAN, thereby enabling communications between machines in the VLAN and preventing communications between machines inside the VLAN and those outside the VLAN. Each of these protocols imposes additional constraints on the LBFO implementation. Consequently, one drawback of existing LBFO implementations is that they do not always implement LBFO within the constraints of the aforementioned security (802.1X and 802.1Q) protocols.

As the foregoing illustrates, what is needed in the art is an LBFO architecture that addresses one or more of the drawbacks of existing LBFO implementations set forth above.

SUMMARY OF THE INVENTION

One embodiment of the invention sets forth a method for configuring a computing device having an operating system and a first network interface card (NIC) and a second NIC configured as a team to support one or more network connections using load balancing and fail-over techniques. The method includes the steps of creating a first function driver associated with the first NIC and a second function driver associated with the second NIC, coupling the first function driver to a software stack within the operating system through a first software binding, coupling the second function driver to the software stack through a second software binding, creating a virtual function driver associated with the team of NICs, and coupling the virtual function driver to the software stack through a third software binding.

One advantage of the disclosed method is that the resulting architecture exposes a single logical NIC to the operating system by using a bus architecture in a novel and efficient manner to create and manage function drivers, software bindings and software handles. The single logical NIC and a network resource manager together perform load balancing, fail-over and fail-back, independent of the operating system, which improves the reliability and networking throughput of the computing device. The single logical NIC also supports the 802.1X and 802.1Q networking standards, which may improve the security of communications between the computing device and other machines in a computer network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
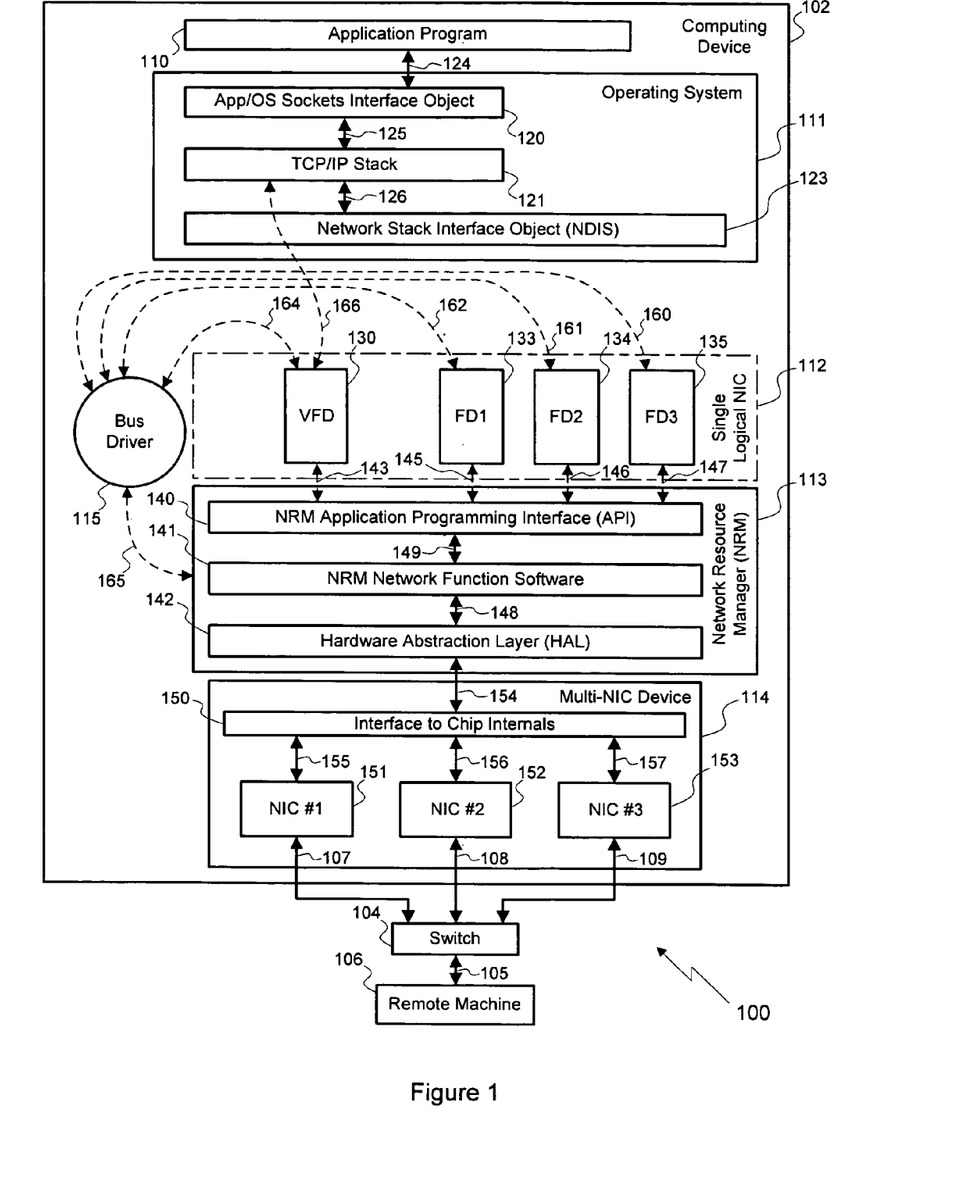
FIG. 1 illustrates a computer network that includes a computing device configured with a single logical NIC, according to one embodiment of the invention.

FIG. 1 illustrates a computer network 100 that includes a computing device 102 configured with a single logical NIC 112, according to one embodiment of the invention. As shown, the computing device 102 also includes, without limitation, an application program 110, an operating system 111, a bus driver 115, a Network Resource Manager (NRM) 113 and a multi-NIC device 114, on which NICs 151,152 and 153 are disposed. The NICs 151,152 and 153 are configured as team, sharing a common IP address and having separate MAC addresses. Importantly, the team is represented to the operating system 111 and the application program 110 as a single "virtual" NIC, as opposed to a collection of three related NICs. The single logical NIC 112 constitutes this virtual NIC.

One embodiment of the present invention is a computer-readable medium storing instructions for causing a computing device having an operating system and a first network interface card (NIC) and a second NIC configured as a team to configure itself to support one or more network connections using load balancing and fail-over techniques by performing the steps of creating a first function driver associated with the first NIC and a second function driver associated with the second NIC, where the first function driver is configured to be coupled to a software stack within the operating system through a first software binding and to a network resource manager through a first software handle, and the second function driver is configured to be coupled to the software stack through a second software binding and to the network resource manager through a second software handle, and creating a virtual function driver associated with the team of NICs, where the virtual function driver is configured to be coupled to the software stack through a third software binding and to the network resource manager through third software handle.

The operating system 111 includes a TCP/IP stack 121, an interface object 120, shown as "App/OS sockets interface object," and a software interface object 123, shown as "network stack interface object (NDIS)," among other software components that have been omitted from FIG. 1 for clarity. The TCP/IP stack 121 is coupled to the interface object 120 through a software interface 125 and is coupled to the interface object 123 through a software interface 126.

The single logical NIC 112 includes a virtual function driver (VFD) 130, a function driver (FD) 133, an FD 134 and an FD 135. The NRM 113 includes a NRM application programming interface (API) 140, a NRM network function software 141 and a hardware abstraction layer (HAL) 142. The NRM network function software 141 is coupled to the HAL 142 through a software interface 148 and is coupled to the NRM API 140 through a software interface 149. The multi-NIC device 114 includes an external hardware interface 150, shown as "interface to chip internals," to which the NIC 151, the NIC 152 and the NIC are coupled through hardware interfaces 155,156 and 157, respectively. The hardware interface 150 is coupled to the HAL 142 of the NRM 113 through a hardware/software interface 154.

The bus driver 115 is coupled to each of the NRM 113, the VFD 130, the FD 133, the FD 134 and the FD 135 through software handles 165,164,162,161 and 160, respectively. As described in greater detail below, for each NIC, a software handle 145, 146 and 147, as the case may be, establishes a communication channel between the function driver for that NIC and a software object in the NRM 113 representing that NIC. Similarly, a software handle 143 establishes a communication channel between the VFD 130 and a software object in the NRM 113 representing the team of NICs. The VFD 130 is coupled to the TCP/IP stack 121 through software binding 166.

The computer network 100 further includes a switch 104 and a remote machine 106. The switch 104 is coupled to the remote machine 106 through a network interface 105 and is coupled to NICs 151, 152 and 153 through network interfaces 107,108 and 109, respectively.

As set forth in greater detail herein, the present invention provides a single logical NIC 112 to the operating system 111. This single logical NIC 112 and the NRM 113 together perform load balancing, fail-over and fail-back, independent of the operating system 111, which improves the reliability and networking throughput of the computing device 102. The single logical NIC 112 also supports the 802.1X and 802.1Q networking standards, which may improve the security of communications between the computing device 102 and other machines in the network 100. Additionally, the relevant device drivers and hardware components within the computing device 102 are configured to automatically generate and persistently maintain the single logical NIC 112. The resulting configuration is automatically and persistently maintained to ensure consistent and reliable configuration upon system reboot.

Bus Architecture

Typically, an operating system communicates with hardware devices through one or more device drivers that directly control their corresponding hardware devices. Device drivers may also communicate with hardware devices through one or more intermediate device drivers to indirectly control their corresponding hardware devices. One example of such indirect control is when a device driver controls a hardware device on a hardware bus through a coupling to an intermediate device driver for the hardware bus, such as a digital camera device driver controlling a digital camera on a Universal Serial Bus (USB) through a coupling to a device driver for the USB. The USB device driver directly controls the communications on the bus, and the digital camera device driver, through its communications with the USB device driver, indirectly controls the communications with the digital camera over the bus. Such an architecture often creates intricate software and hardware hierarchies that must be properly managed to achieve the desired interactions between the operating system and the hardware devices within the system. The technical complexity of such software and hardware hierarchies prompted the development of different software architectures to manage software-hardware communications in a consistent, object-oriented manner.

One such software architecture is called the "bus architecture," which provides generic software objects for creating a hierarchical device driver architecture that is well-suited for indirectly controlling hardware devices on a hardware bus. The bus architecture typically provides a "generic bus driver" software object for controlling the hardware bus and a "generic function driver" software object for indirectly controlling each device on the hardware bus. The generic bus driver and generic function driver are typically supplemented with additional, device-specific software provided by a hardware manufacturer that allows the generic bus driver or generic function driver to communicate with device-specific hardware features associated with the hardware bus or device on the hardware bus, respectively. Such supplemental software creates a "device-specific bus driver" or a "device-specific function driver," referred to herein simply as a "bus driver" or a "function driver." Additionally, the bus driver includes software that identifies which hardware devices are coupled to the hardware bus, creates function drivers for those hardware devices and couples the function drivers to the bus driver through software interfaces. Once created, each function driver either couples itself to its corresponding hardware device through a software handle to the hardware device or couples itself to an intermediate software object representing the hardware device through a software handle to the intermediate software object. The function driver also couples itself to the operating system through a software binding to the operating system provided by a software interface object in the operating system, such as the NDIS 123. Since the function driver is either configured with the specific functionality it needs to manage its associated hardware device or is able to access that functionality from another entity within the system (e.g., through network-oriented calls to the operating system), the function driver is able to act as an interface object indirectly coupling the operating system and its corresponding hardware device.

Importantly, the degree of control the operating system has over a given function driver determines the operating system's degree of control over the hardware device corresponding to that function driver. Since the bus driver controls the creation of the different function drivers within the system and the function drivers create the software interfaces between themselves and the operating system, the bus architecture may be used to control the operating system's interactions with different hardware devices by directly controlling which function drivers are created and by indirectly controlling how those function drivers are coupled to the operating system. Further, once configured, the bus architecture persistently maintains the configuration of the bus driver, the function driver(s) and their couplings by storing this information in the registry or an external data file to ensure that the hierarchical driver configuration is reliably recreated when the computing device reboots. The methods for storing configuration information in the registry or in an external data file are well known to those skilled in the art. Thus, the bus architecture provides a sophisticated software architecture for creating and maintaining hierarchical, persistent device drivers, and the software architecture may be used to control the operating system's interactions with the hardware devices corresponding to the device drivers.

The present invention utilizes the bus architecture in a novel manner to represent a team of NICs to the operating system as a single logical NIC. The single logical NIC includes a function driver for each NIC in the team and an additional function driver, called a virtual function driver, for handling conventional networking communications between the operating system and the team of NICs. By configuring all conventional network traffic and configuration communications to flow between the operating system and the virtual function driver rather than between the operating system and the individual function drivers or NICs, the operating system is effectively prevented from reconfiguring the individual NICs or team of NICs and from attempting to distribute network traffic between the individual NICs within the team. As described in greater detail herein, this configuration is accomplished by selectively removing all bindings between the function drivers and the operating system by a user-level process and through the introduction of an intermediate software object, the NRM, to intelligently control the configuration and communications of the NICs.

Referring again to FIG. 1, the NRM 113 enables the configuration and management of the team of NICs 151, 152 and 153 and the intelligent provision of load balancing, fail-over and fail-back functions to improve the networking throughput and reliability of the computing device 102. The NRM 113 provides a handle, representing the team of NICs 151, 152 and 153, to the virtual function driver 130, thereby allowing conventional network traffic and configuration communications between the VFD 130 and the NRM 113. Within the NRM 113, the network traffic may be distributed across the individual NICs 151, 152 and 153. The NRM 113 may also transmit status information related to the team of NICs 151, 152 and 153, such as an aggregate communications throughput or an aggregate link status indication, to the operating system 111 through the VFD 130. Additionally, as described in greater detail below, the NRM 113 may provide handles to the individual NICs 151,152 and 153 to enable advanced networking features that require NIC-level communications, such as 802.1X. Thus, the single logical NIC 112, which includes the VFD 130, the FD 133, the FD 134 and the FD 135, works together with the NRM 113 to create a virtual interface between the operating system 111 and the team of NICs 151, 152 and 153 that limits the ability of the operating system 111 to interact with individual NICs 151,152 and 153. For example, as the different NICs 151, 152 and 143 either fail or return to operation, the NRM 113 may reconfigure network traffic to recognize the removal or addition of a particular NIC without any user or operating system visibility into the reconfiguration. Further, this structure allows the NRM 113 to intelligently configure the NICs 151, 152 and 153 and efficiently manage their respective network connections to optimize load balancing, fail-over and fail-back functions, as the case may be.

When setting up the architecture illustrated in FIG. 1, the bus driver 115 creates the FD 133, the FD 134 and the FD 135 and then couples itself to each of these function drivers through the software handles 162, 161 and 160, respectively. Initially, each of the FD 133, the FD 134 and the FD 135 couples itself through a software binding to the TCP/IP stack 121 provided by the NDIS 123. Further, the FD 133 couples itself to a software object within the NRM 113 that represents the NIC 151 (not shown) through the handle 145 provided by the NRM API 140, thereby creating a communication channel between the FD 133 and the NIC 151; the FD 134 couples itself to a software object within the NRM 113 that represents the NIC 152 (not shown) through the handle 146 provided by the NRM API 140, thereby creating a communication channel between the FD 134 and the NIC 152; and the FD 135 couples itself to a software object within the NRM 113 that represents the NIC 153 (not shown) through the handle 147 provided by the NRM API 140, thereby creating a communication channel between the FD 135 and the NIC 153. Each of these communication channels may be used in instances where the operating system 111 communicates directly with the individual NICs 151,152 and 153, instead of the team of NICs, such as when 802.1X security credential requests are communicated, as described in greater detail below.

Additionally, the bus driver 115 creates the VFD 130 to provide the interface to the operating system 111 for the single logical NIC 112. Further, the VFD 130 couples itself to a software object within the NRM 113 that represents the team of NICs 151, 152 and 153 (not shown) through the handle 143 provided by the NRM API 140 and to the TCP/IP stack 121 through the binding 166 provided by the NDIS 123, thereby creating a communication channel between the TCP/IP stack 121 and the team of NICs. This communication channel may be used in instances where the operating system 111 communicates directly with the team of NICs, such as when conventional TCP/IP communications are managed and processed by the TCP/IP stack 121 within the operating system 111.

Importantly, a user-level process removes the bindings between the TCP/IP stack 121 and each of the FD 133, the FD 134 and the FD 135 after the bus driver 115 creates these function drivers. Consequently, as shown in the figure, the only binding between the operating system 111 and the single logical NIC 112 is the binding 166. Thus, the binding 166 is the single software interface between the operating system 111 and the single logical NIC 112 for conventional networking communications and for configuration and status information communications. Removing the bindings between the operating system 111 and the FD 133, the FD 134 and the FD 135 ensures that the operating system 111 and third parties are prevented from unilaterally reconfiguring the NICs 151, 152 and 153. As described earlier, the resulting configuration is persistently stored by the underlying storage mechanism incorporated in the bus architecture software. On reboot, the configuration of the computing device 102 is read from storage, and the bus driver 115, VFD 130, the FD 133, the FD 134 and the FD 135, the binding 166 and the couplings 162, 161, 160, 143, 145, 146 and 147 are recreated.

The NRM 113 contains the NRM network function software 141, which includes a local TCP/IP stack (not shown) and performs NIC optimization functions and all dedicated networking functions performed by the NRM 113. Thus, TCP/IP connections may be managed and processed either locally by the NRM 113 or conventionally by the TCP/IP stack 121 within the operating system 111. However, as persons skilled in the art will recognize, incorporating this type of functionality into the NRM 113 enables the NRM 113 to improve the communications throughput of the multi-NIC device 114 by optimizing its configuration and managing network connections across the NICs 151, 152 and 153 better than the operating system 111 could through a conventional device driver architecture. For example, the NRM 113 has information available to it that is not normally available to the operating system 111, such as the amount of traffic being transmitted through specific network connections. This type of information enables the NRM 113 to make more informed network management decisions than the operating system 111, especially in the context of load balancing and fail-over. Further, the NRM 113 includes the hardware abstraction layer 142, which isolates the hardware of the multi-NIC device 114 from the NRM network function software 141, thereby insulating the NRM network function software 141 against subsequent hardware changes to the multi-NIC device 114.

As previously described herein, the NRM 113 also is configured to report status information for the single logical NIC 112 to the operating system 111 through the VFD 130. For example, the single logical NIC 112 may report a throughput to the operating system 111 that represents the aggregate throughput of the individual NICs 151,152 and 153 within the team. Thus, if the individual throughput of each of the NICs 151, 152 and 153 were 100 megabits per second (Mbps), then the throughput of the single logical NIC 112 reported to the operating system 111 would be 300 Mbps. The NRM 113 is configured to adjust the aggregate throughput of the single logical NIC 112 as NICs are added or removed from the team. For example, if a fourth NIC also having a throughput of 100 Mbps were added to the team, the throughput of the single logical NIC 112 would be reported to the operating system 111 as 400 Mbps. Likewise, if NIC 152 were to fail, then the throughput of the single logical NIC 112 would be 200 Mbps. Further, the NRM 113 may report an aggregate link status indication to the operating system 111 indicating whether one or more of the NICs 151, 152 and 153 is enabled. For example, if one or more of NICs 151,152 and 153 were active, then the aggregate link status reported to the operating system 111 would indicate that the single logical NIC 112 is "enabled." However, if all of the NICs were disabled, then the aggregate link status report would indicate that the single logical NIC 112 is "disabled." Providing status information to the operating system 111, such as aggregate throughput and aggregate link status, allows the operating system 111 to report status information about the single logical NIC 112 to users or network monitoring software.

In sum, the disclosed architecture has the following advantages over prior art LBFO implementations. First, LBFO functions are implemented in the NRM 113 where NIC-level operational parameters are monitored, thereby minimizing the amount of communication that occurs between software levels when load balancing, fail-over and fail-back operations are performed. Second, the NRM 113 has access to network traffic information and other NIC-level operational parameters not necessarily available to the operating system 111, which allows the NRM 113 to make more informed load balancing, fail-over and fail-back decisions. Third, the NRM network function software 141 may be specially tailored for complex LBFO management and operations, thereby improving LBFO-related performance relative to prior art implementations. Finally, a single logical NIC 112 is seen by the operating system 111 and the user that effectively limits the ability of the operating system 111 or the user to reconfigure the individual NICs 151,152 and 153 or the team of NICs. Further, the resulting configuration is created and persistently maintained.

802.1X Support

NIC authentication in 802.1X typically begins with the NIC requesting an 802.1X credential from the switch, which forwards the 802.1X request to the credential server. If the 802.1X request is approved, the credential server transmits an 802.1X credential to the switch, which forwards the credential to the requesting NIC. Once the NIC has a valid credential, the NIC is authorized to communicate with the switch until the credential expires or the network connection between the NIC and the switch is interrupted (e.g. if the network cable were disconnected or the NIC were disabled). The networking protocol for a NIC to request and receive a credential from an 802.1X-compatible switch is well known to those skilled in the art.

In one embodiment of the invention, an 802.1X security credential request to authenticate a specific NIC originates from 802.1X software in the operating system 111 and is communicated from the 802.1X software through that NIC's function driver to the NRM 113, which forwards the credential request through the NIC to the switch 104. Unlike conventional TCP/IP communications from the TCP/IP stack 121 to the VFD 130, which transmits the TCP/IP traffic to the NRM 113 where the traffic is distributed between the different NICs 151,152 and 153 in the team, the credential request is transmitted through the actual NIC being authenticated. For example, if the NIC 151 is being authenticated, the 802.1X software transmits an 802.1X security credential request to the FD 133, which subsequently transmits the credential request to the NIC 151 through the handle 145. Once received by the NIC, the credential request is forwarded from the NIC to the switch 104.

Figure 2:
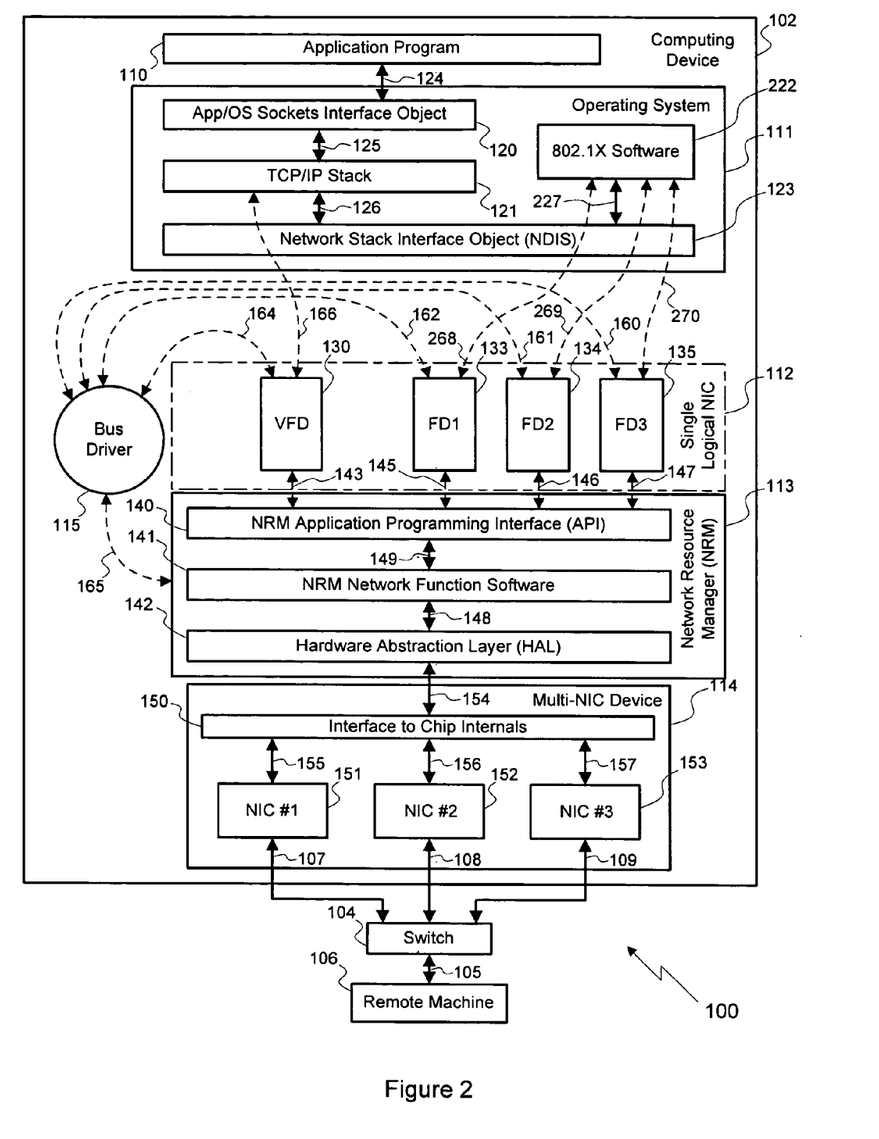
FIG. 2 illustrates the computing device of FIG. 1, where the single logical NIC is configured to support 802.1X, according to one embodiment of the invention.

FIG. 2 illustrates the computing device 102 of FIG. 1 with the single logical NIC 112 configured to authenticate the individual NICs 151,152 and 153 using 802.1X. The operating system 111 includes an 802.1X software program 222, which is coupled to the NDIS 123 through a software interface 227. The 802.1X software program 222 is also coupled to the FD 133, the FD 134 and the FD 135 through a series of software bindings 268, 269 and 270, respectively, that are requested automatically from the NDIS 123 by the function drivers when the function drivers are created. Unlike the TCP/IP bindings initially requested by the bus driver 115 and provided by the NDIS 123 for each the individual function drivers and subsequently removed by a user-level process, the 802.1X bindings 268, 269 and 270 are persistent, meaning that they are a permanent part of the overall system architecture and are recreated upon subsequent reboots of the computing device 102. Importantly, however, an 802.1X binding to the operating system 111 is also requested by the bus driver 115 and provided by the NDIS 123 for the VFD 130, but this binding is removed by the user-level process since the team of NICs, represented to the operating system 111 as the single logical NIC 112, does not attempt team-level 802.1X authentication. Rather, 802.1X authentication is performed at the level of the constituent NICs 151, 152 and 153. In this fashion, the bus driver architecture of FIG. 1 may be adapted to manage the special binding requirements of the 802.1X protocol, thereby enabling the computing device 102 to support this important security protocol for each NIC 151, 152 and 153 in the team.

802.1Q Support

Figure 3:
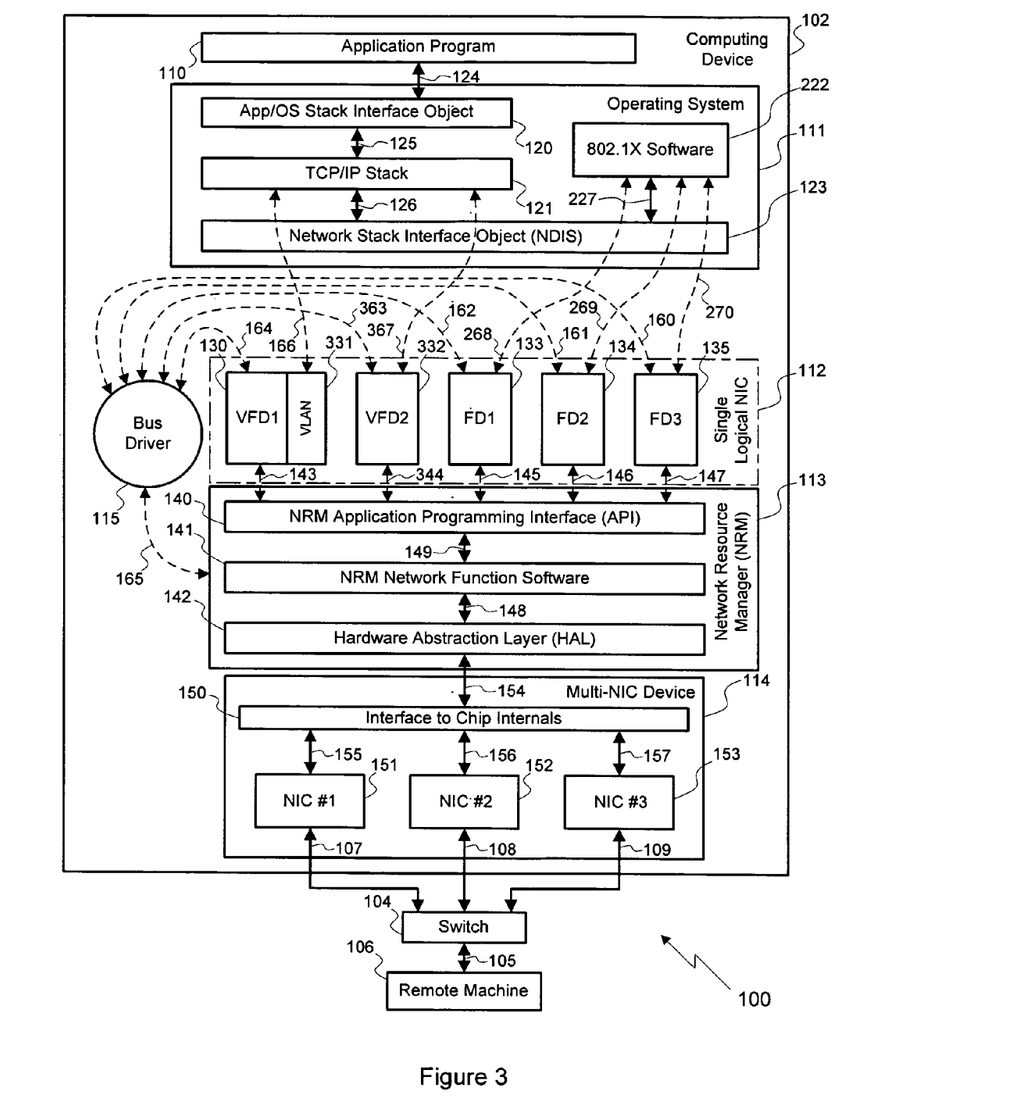
FIG. 3 illustrates the computing device of FIG. 1, where the NICs belong to two VLANs, according to one embodiment of the invention.

In one embodiment of the invention, the computing device 102 may have one or more VLAN assignments that are common to each of NICs 151,152 and 153 in the team. Each such VLAN assignment represents an IP address for the computing device 102 within the IP address range defined for that VLAN. Further, for each VLAN, there is a separate binding between the single logical NIC 112 and the TCP/IP stack 121 for exchanging TCP/IP communications associated with the VLAN. The procedure for configuring a range of IP addresses as a VLAN and assigning machines to the VLAN is well known to those skilled in the art. Reconfiguring the computing device 102 to support a first VLAN assignment requires the bus driver 115 to add a VLAN attribute 331 to the existing VFD 130 and adjust the binding 166 between the VFD 130 and the TCP/IP stack 121 to couple the VLAN attribute 331 and the TCP/IP stack 121. Each additional VLAN assignment requires the bus driver 115 to add another virtual function driver to the single logical NIC 112 and to request a software binding from the NDIS 123 to couple the additional virtual function driver to the TCP/IP stack 121 for exchanging TCP/IP communications associated with the additional VLAN. The additional virtual function driver is also coupled to the NRM 113 similarly to the way the VFD 130 is coupled to the NRM 113 to enable communications between the TCP/IP stack 121 and the team of NICs 151,152 and 153. Further, the binding between the 802.1X software program 222 in the operating system 111 and the additional virtual function driver that is initially created when the bus driver 115 creates the additional virtual function driver is removed by the user-level process, just as the 802.1X binding is removed for the VFD 130. In this configuration, the computing device 102 may communicate with computing devices assigned to any of the VLANs associated with any of the virtual function drivers included in the single logical NIC 112, and the computing device 102 is prevented from communicating with computing devices not assigned to those VLANs, thus supporting the 802.1Q network standard.

FIG. 3 illustrates the computing device 102 including the single logical NIC 112, where the NICs 151, 152 and 153 are assigned to two different VLANs. As shown, the single logical NIC 112 includes the VFD 130, a VFD 332, the FD 133, the FD 134 and the FD 135. The VFD 130 includes a VLAN attribute 331 that is coupled to the TCP/IP stack 121 through the software binding 166. The VFD 130 is coupled to the bus driver 115 and to the NRM API 140 through a pair of software handles, 164 and 143, respectively. The VFD 332 is coupled to the TCP/IP stack 121 through a software binding 367 and is additionally coupled to the bus driver 115 and the NRM API 140 through software handles 363 and 344, respectively. As FIG. 3 illustrates, the first VLAN assignment for computing device 102 is provided by adding the VLAN attribute 331 to the VFD 130 and by adjusting binding 166 to couple the VLAN attribute 331 and the TCP/IP stack 121. The second VLAN assignment for computing device 102 is provided by creating the VFD 332 and coupling it to the TCP/IP stack 121, the NRM API 140 and the bus driver 115 through software handles and a binding as previously described. Importantly, the VLAN attribute 331 and the VFD 332 are coupled to the TCP/IP stack 121 while the FD 133, the FD 134 and the FD 135 are coupled to the 802.1X software program 222. This configuration limits TCP/IP communications to those components within the single logical NIC 112 that communicate VLAN traffic, and limits 802.1X communications to those components within the single logical NIC 112 that communicate 802.1X credential requests through the individual NICs 151, 152 and 153.

While the foregoing is directed to embodiments of the present invention, other and further embodiments of the invention may be devised without departing from the basic scope thereof. For example, in various embodiments, the team of NICs may include any number of NICs. In an embodiment where the computing device 102 includes one NIC, there would be one function driver for the NIC, and a software binding would couple the function driver to the TCP/IP stack 212 for handling conventional network communications between the NIC and the operating system 111. Further, if applicable, another software binding would couple the function driver to the 802.1X software program 222 for authenticating the NIC using 802.1X. To support a first VLAN assignment, a first virtual function driver would be created, and the software binding between the TCP/IP stack 121 and the function driver would be transferred, coupling the first virtual function driver and the TCP/IP stack 121 to enable VLAN traffic to be communicated between the NIC and the TCP/IP stack 121. For each additional VLAN assignment, another virtual function driver would be created along with a software binding that would couple the additional virtual function driver to the TCP/IP stack 121 to enable network traffic associated with the additional VLAN to be communicated between the NIC and the TCP/IP stack 121. In addition to the foregoing, the software components and hierarchy shown in FIGS. 1-3 are exemplary and other functionally equivalent software components or other hierarchies may be implemented without departing from the scope of the invention. Further, the computing device 102 may be a desktop computer, server, laptop computer, palm-sized computer, personal digital assistant, tablet computer, game console, cellular telephone, or any other type of similar device that processes information.

The scope of the present invention is thus determined by the claims that follow.

We claim:

1. A method for configuring a computing device having an operating system and a first network interface card (NIC) and a second NIC configured as a team to support one or more network connections using load balancing and fail-over techniques, the method comprising:
   creating, via a bus driver, a first function driver associated with the first NIC and a second function driver associated with the second NIC, wherein the first function driver is configured to couple the first function driver to a software stack within the operating system through a first software binding, and wherein the second function driver is configured to couple the second function driver to the software stack through a second software binding; and
   creating, via the bus driver, a virtual function driver associated with the first NIC and the second NIC, wherein the virtual function driver is configured to couple the virtual function driver to the software stack through a third software binding,
   wherein a network resource manager is coupled to each of the first function driver, the second function driver and the virtual function driver through software handles, wherein a first software handle couples the first function driver to a first software object within the network resource manager representing the first NIC to establish a communication channel between the first function driver and the first NIC, a second software handle couples the second function driver to a second software object within the network resource manager representing the second NIC to establish a communication channel between the second function driver and the second NIC, and a third software handle couples the virtual function driver to a third software object within the network resource manager representing the team of NICs; and
   wherein a user-level process is configured to remove the first software binding between the first function driver and the software stack and the second software binding between the second function driver and the software stack.

2. The method of claim 1, wherein the software stack within the operating system is a Transport Control Protocol/Internet Protocol (TCP/IP) stack.

3. The method of claim 1, further comprising the step of persistently storing the third software binding between the virtual function driver and the software stack and the software handles that couple each of the first function driver, the second function driver and the virtual function driver to the network resource manager.

4. The method of claim 3, further comprising the step of recreating the third software binding between the virtual function driver and the software stack and the software handles that couple each of the first function driver, the second function driver and the virtual function driver to the network resource manager when the computing device is restarted.

5. The method of claim 1, wherein the first function driver is configured to couple the first function driver to a network security software program within the operating system through a fourth software binding, wherein the second function driver is configured to couple the second function driver to the network security software program through a fifth software binding, and wherein the virtual function driver is configured to couple the virtual function driver to the network security software program through a sixth software binding.

6. The method of claim 5, wherein the user-level process is further configured to remove the sixth software binding between the virtual function driver and the network security software program.

7. The method of claim 6, wherein the network security software program is an 802.1X software program.

8. The method of claim 7, further comprising the step of transmitting an 802.1X security credential request through the first NIC to a network switch, wherein the security credential request is transmitted through the fourth software binding to the first function driver.

9. The method of claim 1, further comprising the step of adding a virtual local area network (VLAN) attribute to the virtual function driver.

10. The method of claim 9, further comprising the step of adjusting the third software binding between the virtual function driver and the software stack within the operating system to couple the VLAN attribute to the software stack.

11. The method of claim 10, wherein the third software binding is for exchanging communications associated with a first VLAN.

12. The method claim of claim 11, further comprising the steps of creating, via the bus driver, a second virtual function driver, wherein the second virtual function driver is configured to couple the second virtual function driver to the software stack through a fourth software binding, and wherein the fourth software binding is for exchanging communications associated with a second VLAN.

13. A method for configuring a computing device having an operating system and a network interface card (NIC) to support one or more network connections, the method comprising:
   creating, via a bus driver, a function driver associated with the NIC, wherein the function driver is configured to couple
   the function driver to a software stack within the operating system through a first software binding for managing network connections conventionally;
   and wherein the function driver is configured to couple the function driver to a network resource manager through a software handle, wherein the network resource manager is configured to manage network connections locally;
   creating, via the bus driver, a virtual function driver associated with the NIC, wherein the virtual function driver is configured to couple
   the virtual function driver to the software stack within the operating system through a second software binding for exchanging communications associated with a virtual local area network (VLAN),
   and wherein a user-level process is configured to remove the first software binding between the function driver and the software stack within the operating system.

14. The method of claim 13, wherein the function driver is configured to couple the function driver to a network security software program within the operating system through a third software binding.

15. The method of claim 14, wherein the network security software program is an 802.1X software program.

16. The method of claim 13, further comprising the steps of creating, via the bus driver, a second virtual function driver, wherein the second virtual function driver is configured to couple the second virtual function driver to the software stack within the operating system through a third software binding for exchanging communications associated with a second VLAN.

\* \* \* \* \*